Patented Sept. 3, 1946

2,406,905

UNITED STATES PATENT OFFICE 2,406,905

METHOD FOR PRODUCING CELLULOSIC STRUCTURES

Henry Shirley Rothrock, Wilmington, Del., assignor to E. I. du Pont de Nemours & Company, Wilmington, Del., a corporation of Delaware No Drawing. Application May 6, 1941, Serial No. 392,116

2 Claims. (Cl. 117—145)

This invention relates to regenerated cellulose structures, especially those of pellicular nature. More particularly, it relates to a method for producing flexible and durable regenerated cellulose pellicles by treating the same with a softening agent comprising a synthetic linear polymeric compound.

This application is related to my copending application, Serial No. 392,115, filed of even date herewith.

It has been found that glycerol, ethylene glycol and other agents such as formamide, diethylene glycol, and the like used heretofore for the softening of regenerated cellulose products have possessed two serious disadvantages; namely, volatility and a tendency to transfer or migrate to other materials in contact with the softened regenerated cellulose. Since the softening action is highly critical, it is essential that the precise concentration of a given softener within the cellulosic body be maintained at a relatively constant value. For example, if the concentration of softener is too high, the cellulosic films will be unduly limp and sticky, whereas if the concentration is too low the article will be brittle and lack durability. An effort is therefore made at the time of manufacture to incorporate precisely the correct amount of softener to obtain the physical properties desired in the final film. However, in the case of a pellicle with a large area exposed to the atmosphere for long periods of time, even those softening agents which have a very low but appreciable vapor pressure will in time escape to a sufficient degree to lower the concentration in the film below that at which satisfactory softening action is obtained.

Difficulties arising from a decrease in softener content may also be brought about in quite a different manner from the escape of the softener through volatilization. It has been observed that regenerated cellulose products which are in contact with other cellulosic bodies have a tendency to lose their softening agent when this agent is of the type represented by glycerol and glycol and, in fact, most of the softening agents heretofore known. As an example, cellulosic products such as paper, cotton, linen fabric, etc., wrapped in thin pellicles of regenerated cellulose softened with glycerol are found after a short time to extract a large portion of the glycerol from the pellicle used as a wrapping tissue, leaving the latter brittle and absorbent. This is a serious restriction in the use of these materials for wrapping a large number of products which may be otherwise advantageously wrapped in such transparent tissue.

It is, therefore, an object of this invention to provide a new and useful method for producing softened regenerated cellulose materials possessing desirable physical properties.

It is a further object to provide regenerated cellulose materials having a softening agent associated therewith which softening agent will not tend to escape through volatilization or through transfer to other cellulosic bodies.

Other objects of the invention will appear hereinafter.

The objects of this invention may be accomplished by incorporating, as a softening agent, in a regenerated cellulose sheet or film, a water-soluble synthetic linear polymer having a molecular weight above 400 and a boiling point of at least 170° C. at a pressure of 1 millimeter of mercury.

A wide variety of polymeric materials are found to be useful in this operation. It is a necessary condition that the polymeric materials used in this invention be sufficiently water soluble to permit their introduction into the regenerated cellulose sheet by means of an aqueous solution. In general, adequate water solubility is insured by incorporating in the polymeric compositions solubilizing groups separated preferably by one or two carbon atoms. When the atom chain between the solubilizing groups consists of more than two atoms it may also possess one or more interruptions by hetero atoms, e. g., O, N, or hetero groups such as $SO_2$ and other groups which contribute to water solubility in organic compounds.

The preferred method of carrying out this process consists in passing a regenerated cellulose sheet, after the necessary purifying, bleaching and washing operations, through an aqueous bath containing a prescribed amount of water-soluble polymeric softening agent. After impregnation, excess solution is removed and the film is dried in a suitable manner.

The following examples are given to illustrate the preferred methods of carrying out the present invention. The parts and percentages referred to are parts and percentages by weight.

Example I

Viscose is extruded into a bath comprising sulfuric acid and sodium sulfate to effect a coagulation and/or regeneration of the viscose to a self-sustaining film. This film is then desulfured, bleached, and washed according to Brandenberger United States Letters Patent No. 1,548,864. Before drying, the sheet of gel regenerated cellulose is immersed in or drawn through an aqueous bath maintained at a temperature of 30° C. and containing 11% of glycol polyformal having a molecular weight of approximately 440. The film remains in contact with this bath sufficiently long to thoroughly impregnate the gel structure with the solution, after which it emerges from the bath, excess liquid is removed from the surface thereof by means of squeeze rolls, doctor knives, etc., and the film dried on the conventional roll drier. After drying, the film is found to contain 20% glycol polyformal, based on the weight of the cellulose, and approximately 6% water. The film so produced is transparent, flexible, and durable. The loss of softening agent through volatilization or migration to other cellulosic bodies such as paper and fabric is only one-tenth as great as that shown in corresponding glycerol softened films.

The glycol polyformal is prepared by heating monomeric glycol formal at 160° C. for a period of five hours in the presence of a catalytic amount of concentrated sulfuric acid. The acidic catalyst is neutralized, unreacted monomer is removed and the product extracted with a suitable solvent or used directly.

Example II

The film prepared as in Example I is passed through a bath containing 7% glycol polyformal having a molecular weight of approximately 710 and prepared as in the preceding example. Excess solution is removed from the surface of the web, and the same dried in the conventional type of roll drier. Films so produced are found to have a softener content of 12% based on the weight of the cellulose, and a moisture content of 6%. This film is transparent, highly flexible, durable, and shows practically no loss of softening agent when in contact with cellulosic materials such as paper and fabric.

Example III

Film produced as in Example I is passed through a bath containing 11% of glycol polyformal of molecular weight 1284, prepared in the general manner described in Example I. The excess solution is removed from the surface of the film, and the same dried in the customary manner. The final product contains 20% of the softening agent, is transparent and soft and maintains its high flexibility and durability when in contact with other cellulosic bodies. The loss of softening agent by volatilization and migration to other cellulosic materials is less than one-tenth that exhibited by glycerol softened films.

Example IV

Film produced as in Example I is passed into a bath containing an 11% solution of stearic acid-glycol polyformal having a molecular weight of approximately 1280. Excess solution is removed from the surface of the web by means of squeeze rolls and the product dried in the usual manner. The film so produced contains 8% of softening agent, is transparent and shows no loss of softener by volatilization or by migration to other cellulosic bodies.

The polymeric material is prepared by heating one part by weight of stearic acid with 10 parts by weight of glycol formal in the presence of 0.1% to 0.5% by weight of an anhydrous acidic catalyst for a period of 5 hours, followed by neutralization of the catalyst and removal of unreacted glycol formal.

Example V

Film prepared as in Example I is passed through an aqueous bath containing 11% of cetyl alcohol-glycol polyformal having a molecular weight of approximately 1316. The film produced after removal of excess solution and drying in the usual manner is transparent, flexible and maintains its durability in contact with other cellulosic materials such as cloth and paper.

This polymeric product may be prepared by heating at 100° C. for five hours one part by weight of cetyl alcohol with 18 parts by weight of glycol formal in the presence of 0.5% by weight of an anhydrous acidic catalyst after which the catalyst is neutralized and unreacted glycol formal is removed.

Example VI

Film produced as in Example I is immersed in an aqueous bath containing 15% of glycol diglycolate polyester prepared through the action of one part by weight of diglycolic acid with approximately one and two-tenths parts by weight of ethylene glycol under the influence of an acidic catalyst. Excess solution is removed from the surface of the film and the same dried in the usual manner. The pellicle so produced contains 23% of the softening agent and is flexible, transparent and durable.

Example VII

Film prepared as in Example I is suspended in a bath containing 7% of polyethylenimine synthesized through the action of a polymerization promoting acid catalyst on ethylenimine according to British Patent No. 461,354. After heating at 100° C. for 20 hours, the film is washed with cold water, with alcohol, and the same dried in vacuo at 100° C. The film so produced containing 5.31% nitrogen is soft and durable and shows good receptivity to various dyeing agents.

Example VIII

Film prepared as in Example I is immersed in a bath containing 11% of polyethylene oxide (Carbowax 1500).

Excess solution is removed from the surface of the web, and the same dried in the conventional type of roll drier. Film so produced is found to have a softener content of 17%, based on the weight of the cellulose, and a moisture content of 6%. This film is transparent, highly flexible, and durable, and shows no loss of softening agent in contact with cellulosic materials, such as paper and fabric. The polyethylene oxide may be synthesized, for example, by heating the monomeric oxide in the presence of a suitable catalyst (preferably an alkaline catalyst) until a substantial proportion of polymer is formed, and removing the unchanged monomer. (Staudinger, Die Hochmolekularen Organischen Verbindungen, 1932, p. 287, et. seq.)

Example IX

Film prepared as in Example I is passed through a bath containing 11% of a reaction product of ethanolformamide and ethylene oxide described in the following paragraph having an average molecular weight of 469. Excess solution is removed from the surface of the film and dried in the conventional manner. The film so produced contains 17% of the softening agent, is transparent and highly flexible and shows no loss of softener either by volatilization or by migration.

The above softening agent may be prepared by passing ethylene oxide into ethanolformamide at a temperature above 100° C. and under the influence of an alkaline catalyst until the desired molecular weight has been attained.

*Example X*

Film prepared as in Example I is suspended for 10 minutes in a bath containing 10% of polymeric quaternary ammonium bromide described below. Excess solution is removed from the surface of the film and the same dried in the conventional manner. A clear film is so produced which retains the softening agent permanently. The polymeric quaternary ammonium compound may be prepared by heating N,N,N',N'-tetramethyl decamethylenediamine and p-xylylene dibromide in methanol for a period of 42 hours.

*Example XI*

Film produced as in Example I is immersed in an aqueous bath containing 20% of polyvinyl alcohol having a molecular weight of about 3600 and containing approximately 20% of polyvinyl acetate during a period of one hour. Excess solution is removed from the surface of the web and the film dried on the conventional roll drier. After drying the film is found to contain 10% of the softening agent. A transparent film is so produced which permanently retains the softening agent.

The polyvinyl alcohol is prepared by heating monomeric vinyl acetate in toluene at 100° C. in the presence of 1% of benzoyl peroxide to yield polyvinyl acetate, (Starkweather and Taylor, J. Am. Chem. Soc. 52, 4708 (1930)), from which the polyvinyl alcohol is obtained by hydrolysis.

*Example XII*

The film prepared as in Example I is immersed for one hour in an aqueous bath containing 10% of polyvinyl alcohol of molecular weight 3600 containing approximately 2% polyvinyl acetate, and prepared as in the preceding example. Excess solution is removed from the surface of the web and the film dried in the conventional type of roll drier. Films so produced are found to have a softener content of 4%, which is retained when the films are in contact with other cellulosic materials such as paper or textiles.

*Example XIII*

The film prepared as in Example I is immersed for one hour in an aqueous bath containing 10% of polyvinyl alcohol having a molecular weight of about 12,000, containing approximately 20% polyvinyl acetate and prepared as in the preceding examples. Excess solution is removed from the film and the same dried in the usual manner. A transparent film was produced containing 5% of the softening agent which was retained in the film in contact with other cellulosic materials such as textiles and paper.

*Example XIV*

The film prepared as in Example I is immersed for one and one-half hours in an aqueous bath containing 10% of a polyamidine hydrochloride described below. Excess solution was removed from the film and the same was dried in the conventional type of drier. A transparent film was produced which retained the softening agent even in contact with other cellulosic materials.

The polymer was prepared as described in copending application Serial No. 350,108, filed August 2, 1940, by mixing equivalent quantities of adiponitrile dimethyl diimino ether dihydrochloride and hexamethylenediamine in methanol and allowing to stand at room temperature for 48 hours.

*Example XV*

Film prepared as in Example I is immersed for one hour in an aqueous bath containing 15% of a polymeric urea described in the following paragraph. After removal of excess solution and drying the film is found to retain the softening agent permanently.

The polymeric urea is prepared by heating equivalent amounts by weight of butyldiethanolamine and bis-N,N'-methoxymethyl-urea at approximately 100° C. for a period of 3 to 4 hours. The polymer so produced is solubilized by treating with an equivalent amount of a mineral acid such as hydrochloric acid.

*Example XVI*

The film prepared as in Example I is immersed for one hour in an aqueous bath containing approximately 5% of polymeric sulfonium salt described below. After the film has been soaked for one hour excess aqueous solution is removed and the film dried. The film so produced retains the softening agent when in contact with other cellulosic materials such as paper and textiles.

The sulfonium compound is prepared as described in copending application Serial No. 319,791, filed February 19, 1940, by dissolving polyhexamethylene sulfide in toluene at reflux temperature followed by addition of a slight excess of dimethyl sulfate. Heating is discontinued as soon as dimethyl sulfate is added since the heat evolved is sufficient to maintain reaction. When the spontaneous reaction has subsided excess dimethyl sulfate is destroyed by addition of alkali solution and the product is made up in aqueous solution.

*Example XVII*

Film prepared as in Example I is immersed for one hour in an aqueous bath containing 15% of a polymeric acid material, the preparation of which is outlined in the next paragraph. The film produced after drying is transparent and does not lose its durability when in contact with paper, textiles, or cotton.

The polymeric acid may be prepared by heating in a bomb at 150° C., 1200 grams of maleic anhydride, 1500 grams of ethylene, and 40 grams of benzoyl peroxide in 6 liters of xylene. The product is washed with benzene and ether and then made up in the required aqueous solution by dissolving in an equivalent amount of alkaline solution.

*Example XVIII*

Film produced as in Example I is immersed for one hour in an aqueous bath containing 15% of a polymeric phosphate described below. Excess solution was removed from the film and the same was dried in the customary manner. A permanently impregnated film is produced.

The polymeric phosphate is prepared by allowing equal parts by weight of ethylene glycol and phosphorus oxychloride to react spontaneously followed by heating for 4 hours.

*Example XIX*

Film produced as in Example I is immersed for one hour in a bath containing 15% of polyphosphonamide at a temperature of 30° C. After removal of excess solution and drying the film is found to retain the softening agent when in contact with other materials such as textiles or paper.

The polyphosphonamide is prepared by heating one part of phosphoric acid with 1.15 parts of hexamethylenediamine for one hour at 230°–260° C.

*Example XX*

Film prepared as in Example I is immersed for one hour in an aqueous bath containing 5% of glycerol and 15% of polyethylene oxide prepared as in Example VIII. Excess solution is removed from the film by means of squeeze rolls and the film dried in the conventional type of roll drier. The film so produced is flexible, transparent, and durable.

*Example XXI*

A regenerated cellulose pellicle in the form of a tube is coagulated, regenerated, and purified in a manner similar to that for film and is then passed through a bath containing 11% of the reaction product of methyl Cellosolve and ethylene oxide, prepared in the same manner as described in Example IX, said reaction product having an average molecular weight of approximately 783. Excess liquid is removed from the surface of the tube, the same cut into short lengths and applied to the mouth and neck of a liquor bottle as a secondary closure. Upon evaporation of the moisture, the band shrinks into intimate contact with the neck of the bottle, serving to protect the cork or other primary closure and the upper portion of the neck of the bottle. This cellulosic band is in contact with the paper liquor stamp with which such bottles are provided. It is found that even after long periods of storage, the softening material does not transfer from the cellulosic band to the paper of the tax stamp, and hence the cellulosic band is not embrittled or otherwise deleteriously affected so as to cause its premature removal from the bottle.

All of the examples given have been set forth in terms of a sheet or film of gel regenerated cellulose (gel regenerated cellulose is a water swollen regenerated cellulose which never has been dried). Obviously this is the more practical way of practicing the invention since the softening agent is customarily incorporated into the sheet or film while the latter is in the gel state in and during the normal course of manufacture. Obviously, if one desires to impregnate an already dried regenerated cellulose film with a softener of the character described, it is possible to rewet the dried film so as to render it highly swollen whereupon it may be treated with treating baths similar to those described, but of composition suitable to obtaining the final product desired.

As the water-soluble synthetic linear polymeric softening agents suitable for use in accordance with the present invention, the polymers of the following recurring units are representative:

Amides: 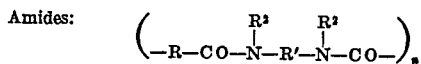

Esters: $(-R-CO-O-R'-O-CO-)_n$

Amidines: 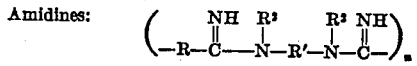

Iminoethers: 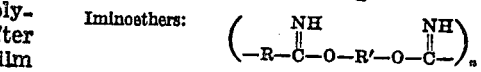

Ureas: 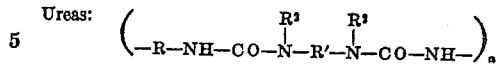

Quaternary ammonium salts: $(-R-NR^2R^3X-R'-NR^2R^3X-)_n$

Acetals: $(-R-O-CHR^2-O-)_n$

Ketals: $(-R-O-CR^2R^3-O-)_n$

Alcohols: 

Sulfonium salts: $(-R-SR^2X-R'-SR^2X-)_n$

Imines: $(-R-NH-R'-NH-)_n$

Sulfonamides: 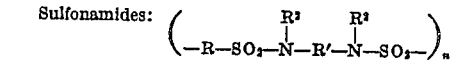

Acids: 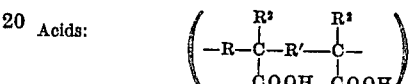

Phosphonamides: 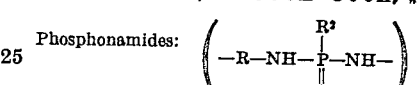

Phosphates: 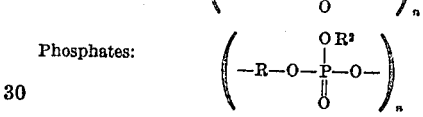

Urethanes: $(-R-NH-CO-O-R'-O-CO-NH-)_n$

Guanidines (and their salts): 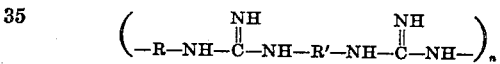

Ethers: $(-R-O-R'-O-)_n$

Sulfonic acids: 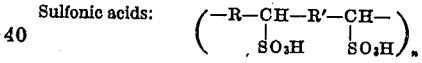

in which R and R' are divalent organic radicals, preferably containing one or two carbon atoms which may be alike or different; $R_2$ and $R_3$ are either hydrogen or monovalent hydrocarbon radicals; X is an acidic radical such as halogen; and n is a number sufficiently high so that the molecular weight of the polymer is above 400. It may be desirable to incorporate in the atom chain other hetero atoms or groups such as O, N or $SO_2$ as exemplified in the case of polymeric triglycol adipamide,

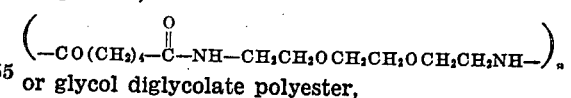

or glycol diglycolate polyester,

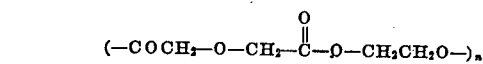

An example of synthetic linear polymer which is illustrative of the general type of polymeric materials useful in this process is polyvinyl alcohol, $$R-(CH_2-CHOH-CH_2-CHOH-CH_2-CHOH-)_n-R$$

It is seen that the group (—CHOH—) recurs in a linear manner to yield a long chain polymeric compound. The presence of the OH groups on alternate carbon atoms in the chain insures sufficient water solubility for the purpose of this process.

Depending upon the type of film desired, various modified polymeric materials may be employed such as the products obtainable through the reaction of a monomeric alkylene oxide or glycol formal with such active hydrogen compounds as acids, amines, amides and alcohols as typified by glycerol, ethanolamine or formamide.

It is possible and in some cases even desirable to employ as softening compositions mixtures either of one polymer with another or of a polymeric with a monomeric softening agent. As typical examples of these mixtures one may cite mixtures of polyvinyl alcohol with polyethylene oxide, polyethylene oxide with glycerol or urea, and glycol polyformal with glycerol.

As above stated, the polymeric softeners of the present invention should have a molecular weight above 400 and a boiling point above 170° C. at a pressure of 1 millimeter of mercury. It is essential also that the polymeric products have a water solubility at a temperature of 25° C. of at least 4% in order that they may be introduced in a satisfactory manner into regenerated cellulose.

The preferred concentrations of softener in aqueous bath may range from 4% to 15%, although in some cases higher concentrations may be required to insure adequate impregnation of softening agent in the cellulosic structure. Likewise, the time of immersion may be varied from a few seconds to an hour or more depending upon the rapidity with which the particular polymer is impregnated into the regenerated cellulose. The temperature of the aqueous bath may be conveniently maintained at 25°–30° C. although in some cases a higher temperature may be desirable. After the regenerated cellulose sheet or film is dried it should, for normal uses, contain from 8% to 25% of softener based on the weight of the dry film.

If a colored cellulosic film is desired, it may be obtained in any of the ways commonly known in the art, including the passage of the sheet or film through a bath containing a suitable dyestuff. If desired, the dyestuff may be added to the bath used for introducing the softening agent. In the same way, after the film has been treated with softening agent, it may be subjected to any of the customary after-treatments, such as sizing or coating or the like which may be customarily given to cellulosic pellicles of the type described, in just the same manner that a glycerol softened regenerated cellulose film, for example, may be treated.

The outstanding advantage of the polymeric softening agents of this invention over those described in the prior art is the permanence with which they remain in a non-fibrous cellulosic structure. Since they are of very low volatility, they are not lost through volatilization, such as a number of well-known softeners, e. g., ethylene glycol and glycerol. Furthermore, they do not migrate or transfer out of the transparent cellulose structure to other cellulosic structures with which the film may be in contact. This last-named property permits use of these materials in the form of thin sheets as wrappings with cellulosic materials, e. g., fabrics, textiles, paper, etc., and permits their long and continued contact with the contents of the package without losing the softening agent and, consequently, with the retention of the flexibility and durability of the original wrapping tissue. As another example, caps and bands used as secondary closures for containers may be applied to the mouths and necks of bottles over paper labels and still exhibit no tendency to embrittlement, splitting, and cracking after long periods of storage.

Since it is obvious that many changes and modifications can be made in the above-described details without departing from the nature and spirit of the invention, it is to be understood that the invention is not to be limited to the details described herein except as set forth in the appended claims.

I claim:

1. The process which comprises passing a flexible regenerated cellulose pellicle in a highly swollen condition through an aqueous bath containing, dissolved therein, between 4% and 15% of a synthetic linear polymer having a molecular weight above 400 and a boiling point of at least 170° C. at a pressure of 1 millimeter of mercury, said pellicle being maintained in contact with the bath liquid for a sufficient period of time to impregnate the same with from 8% to 25% of said polymer.

2. The process which comprises passing a regenerated cellulose pellicle, in the gel state, through an aqueous bath containing, dissolved therein, between 4% and 15% of a synthetic linear polymer having a molecular weight above 400 and a boiling point of at least 170° C. at a pressure of 1 millimeter of mercury, said pellicle being maintained in contact with the bath liquid for a sufficient period of time to impregnate the same with from 8% to 25% of said polymer.

HENRY SHIRLEY ROTHROCK.